United States Patent
Roffat et al.

(10) Patent No.: US 9,105,903 B2
(45) Date of Patent: Aug. 11, 2015

(54) ALL-SOLID-STATE LITHIUM BATTERY, AND PRODUCTION METHOD THEREFOR

(75) Inventors: Michael Roffat, Chateauroux (FR); Frederic Le Cras, Vinay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 55 days.

(21) Appl. No.: 13/823,550

(22) PCT Filed: Sep. 1, 2011

(86) PCT No.: PCT/FR2011/000486
§ 371 (c)(1),
(2), (4) Date: Mar. 14, 2013

(87) PCT Pub. No.: WO2012/035211
PCT Pub. Date: Mar. 22, 2012

(65) Prior Publication Data
US 2013/0177811 A1   Jul. 11, 2013

(30) Foreign Application Priority Data
Sep. 17, 2010   (FR) ...................... 10 03704

(51) Int. Cl.
*H01M 4/131* (2010.01)
*H01M 4/04* (2006.01)
*H01M 4/13* (2010.01)
*H01M 4/62* (2006.01)
*H01M 10/0562* (2010.01)
(Continued)

(52) U.S. Cl.
CPC ............ *H01M 4/131* (2013.01); *H01M 4/0433* (2013.01); *H01M 4/0471* (2013.01); *H01M 4/13* (2013.01); *H01M 4/1391* (2013.01); *H01M 4/624* (2013.01); *H01M 10/0562* (2013.01); *H01M 10/39* (2013.01); *Y02E 60/122* (2013.01); *Y10T 29/49108* (2015.01)

(58) Field of Classification Search
None
See application file for complete search history.

(56) References Cited

U.S. PATENT DOCUMENTS

| 5,554,272 A * | 9/1996 | Benco et al. ................. 205/778 |
| 2004/0131944 A1 | 7/2004 | Visco et al. |
| 2005/0161340 A1 * | 7/2005 | Gordon et al. ............... 205/618 |

(Continued)

FOREIGN PATENT DOCUMENTS

| WO | WO 00/70694 | 11/2000 |
| WO | WO 02/061865 A2 | 8/2002 |

OTHER PUBLICATIONS

Amatucci et al., "Surface treatments of $Li_{1+x}Mn_{2-x}O_4$ spinels for improved elevated temperature performance," Solid State Ionics, 1997, vol. 104, pp. 13-25.

(Continued)

*Primary Examiner* — Patrick Ryan
*Assistant Examiner* — Wyatt McConnell
(74) *Attorney, Agent, or Firm* — Oliff PLC

(57) ABSTRACT

The invention relates to an all-solid-state lithium battery and to a method for producing such a battery. The all-solid-state lithium battery includes first and second electrodes separated by a solid electrolyte. The second electrode is formed by a composite material including an electrochemically-active material made of a lithium-ion insertion material, and an amorphous lithium-based material which is an ionic conductor for the lithium ions and which is inert relative to the electrochemically active material.

5 Claims, 3 Drawing Sheets

(51) Int. Cl.
*H01M 10/39* (2006.01)
*H01M 4/1391* (2010.01)

(56) References Cited

U.S. PATENT DOCUMENTS

2006/0057463 A1   3/2006   Gao et al.
2008/0268346 A1   10/2008  Inda
2009/0214957 A1*  8/2009   Okada et al. .................. 429/319

OTHER PUBLICATIONS

Sakuda et al., "All-solid-state lithium secondary batteries with oxide-coated $LiCoO_2$ electrode and $Li_2S$-$P_2S_5$ electrolyte," Journal of Power Sources, 2009, vol. 189, pp. 527-530.

* cited by examiner

ALL-SOLID-STATE LITHIUM BATTERY, AND PRODUCTION METHOD THEREFOR

TECHNICAL FIELD OF THE INVENTION

The invention relates to an all-solid-state lithium battery comprising first and second electrodes separated by a solid electrolyte.

The invention also relates to a method for producing such a battery.

STATE OF THE ART

Many works have been done on developing rechargeable electrochemical lithium batteries also called "all-solid-state" working at high temperatures and/or high pressures. All-solid-state lithium batteries are composed of a stacking of thin solid layers, successively deposited onto a substrate by conventional techniques used in the micro-electronics industry in particular such as physical vapor deposition (PVD), chemical vapor deposition (CVD) or lithography techniques. Such batteries find applications, in particular, in such fields as nuclear and aerospace technologies where they are subjected to heavy conditions of use (high temperatures and/or high pressures).

For applications at high temperatures and/or high pressures, ceramic and glass-ceramic materials are promising materials for the solid electrolyte in all-solid-state lithium batteries because of their high conductivity and great stability at high temperatures. Among the most known ceramics having the highest ion conductivities for lithium, one can mention the perovskite of lithium and lanthanum titanate $Li_{3x}La_{2/3-x\ 1/3-x}TiO_3$ (LLTO), materials of the lithium-based super ionic conductor type having a crystallographic structure known as NaSICON (Na Super Ionic CONductor).

Nevertheless, parasitic reactions of electrochemical reductions have been observed at low working potentials between the solid electrolyte of this type and the negative electrode, generating an electronic conductivity within the solid electrolyte. Currently, the use of ceramic and glass-ceramic materials in lithium batteries can be functional only in partnership with a negative electrode having a sufficiently high working potential in order to avoid the electrochemical reduction of the electrolyte with the negative electrode. As an example, for a traditional perovskite-LLTO electrolyte, the negative electrode must be formed of a material having a working potential higher than $1.8V/Li^+/Li$ in order to avoid the occurrence of an electronic conductivity within the solid electrolyte. In the same way, for a traditional "NaSICON" electrolyte, the negative electrode must be formed of a material having a working potential higher than a potential between $1.8V$ and $2.4V/Li+/Li$.

Research has been carried out to avoid the electrochemical reduction of the solid electrolyte with the negative electrode and has been directed towards the modification of the solid electrolyte itself. As an example, document US-A-20080268346 describes a solid electrolyte composed of a glass-ceramic powder and a copolymer formed by a mixture of polyethylene oxide and other organic polymers. The solutions suggested are however not entirely satisfactory because the addition of carbonaceous chains into the electrolyte increases the electronic conductivity of the electrolyte and induces a notable fall of the stability of the electrolyte.

Another alternative way has also been proposed and consists in introducing a protective layer forming an interlayer between the negative electrode and the solid electrolyte of the glass-ceramic type. Document US-A-20040131944 reveals, for example, a protective interlayer formed of a nitrided material, for example, of lithium phosphorous oxynitride (LiPON), $Li_3N$ or $Cu_3N$. The introduction of such a layer however affects the electrochemical performances of the batteries, in particular by decreasing the total ionic conductivity which then lies between $10^{-7}$ S/cm and $10^{-6}$ S/cm.

OBJECTIVES OF THE INVENTION

The objective of the invention is to propose a lithium battery able to be used at high temperatures and/or high pressures.

The objective of the invention is also to produce an all-solid-state lithium battery having improved electrochemical performances and being stable at high temperatures and/or high pressures, in particular, having a temperature strength up to 900° C.

Another objective of the invention relates to a method for producing such a battery which is simple, easy to implement and inexpensive.

According to the invention, these objectives are reached by an all-solid-state lithium battery and a production method therefor according to the indexed claims.

BRIEF DESCRIPTION OF THE DRAWINGS

Other advantages and features will more clearly arise from the following description of particular embodiments of the invention given as nonrestrictive examples and represented in the annexed drawings, in which.

DESCRIPTION OF PARTICULAR EMBODIMENTS

Figure 1:
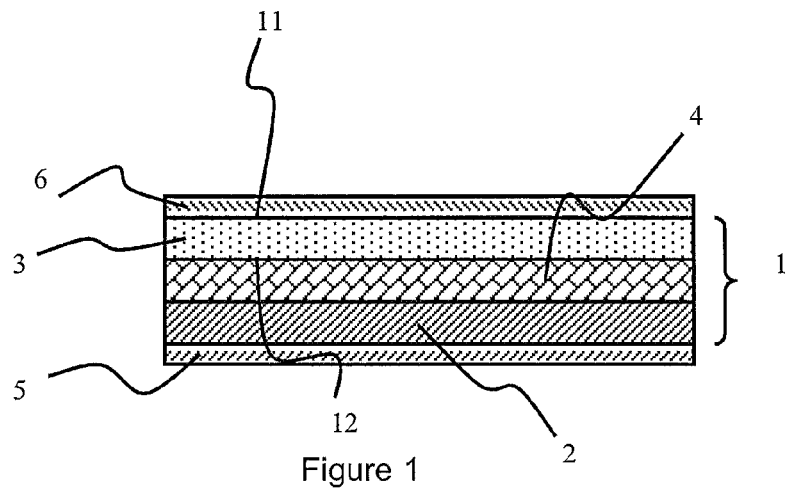
FIG. 1 represents a schematic and sectional view of a lithium battery according to a particular embodiment of the invention.

According to a particular embodiment of the invention represented in FIG. 1, an all-solid-state lithium battery comprises a stacking 1 of thin solid layers. The stacking 1 is formed by first and second electrodes, respectively 2 and 3, separated by a solid electrolyte 4.

The thickness of the first and second electrodes, respectively 2 and 3, preferably is comprised between 0.1 μm and 100 μm.

The stacking 1 can be traditionally arranged between first and second current collectors 5 and 6. The first and second current collectors 5 and 6 are respectively in contact with the first and second electrodes 2 and 3. The first and second current collectors 5 and 6 are traditionally made of metal, for example they are formed by a metal chosen among titanium, aluminum, copper and platinum or an alloy thereof. The thickness of the first and second current collectors 5 and 6 lies between 0.1 µm and 10 µm.

The solid electrolyte 4 is traditionally formed by a layer of a lithium conductor material and has a thickness preferably between 100 µm and 2000 µm, preferably between 100 µm and 500 µm. Advantageously, the solid electrolyte 4 has a total ionic conductivity for the lithium ions, at the ambient temperature, higher than or equal to $10^{-5}$ S/cm, preferably higher than or equal to $10^{-4}$ S/cm, ideally higher than or equal to $10^{-3}$ S/cm.

As an example, the solid electrolyte 4 is an oxide, possibly doped with other materials in order to improve the total ionic conductivity for the lithium ions.

Advantageously, the solid electrolyte 4 is selected among dense ceramics, preferably having a compactness higher than 95%, and totally gas-tight glass-ceramics. The solid electrolyte 4 is preferably selected among the perovskites having a total ionic conductivity for the lithium ions, at the ambient temperature, of about $10^{-5}$ S/cm to $10^{-4}$ S/cm, the materials of the NaSICON type having a total ionic conductivity for the lithium ions, at the ambient temperature, of about $10^{-4}$ S/cm to $7.10^{-4}$ S/cm, the glass-ceramics having a total ionic conductivity for the lithium ions, at the ambient temperature, of about $10^{-3}$ S/cm or the Garnet-structured oxides having a total ionic conductivity of $10^{-5}$ S/cm to $2.10^{-4}$ S/cm.

The solid electrolyte 4 is preferably selected among:
the perovskites having the formulas $Li_{3x}La_{2/3-x\ 1/3-x}TiO_3$, $La_{2/3-x}Sr_{x\|1/3-x}Li_xTiO_3$ and $La_{2/3}Li_{x\ 1/3-x}Ti_{1-x}Al_xO_3$,
the NaSICONs having the formulas $Li_{1+x}M_xN_{2-x}(PO_4)_3$ and $Li_{1+x+y}M_xN_{2-x}Q_yP_{3-y}O_{12}$,
where
M is selected among Al, Ga, Cr, Sc,
N is selected among Ti, Ge, Hf and
Q is selected among Si, Se
the ceramic oxides having a Garnet structure such as the oxides $Li_6La_2BaTa_2O_{12}$ and $Li_{5.5}La_3Nb_{1.75}In_{0.25}O_{12}$.

Advantageously, the first and second electrodes 2 and 3 form the positive electrode and the negative electrode of the all-solid-state lithium battery, respectively.

Preferably, the first electrode 2 is formed by an electrochemically active material of positive electrode. The electrochemically active material of the first electrode 2 can be selected among insertion or intercalation materials for the lithium ion, $Li^+$, and the oxides or mixed oxides possibly containing lithium. The electrochemically active material of the first electrode 2 can be chosen for example among $LiCoO_2$, $LiMn_2O_4$, $LiFePO_4$, $V_2O_5$, $WO_3$, $MnO_2$, $Li_{1-x}Mn_{2-y}M_yO_4$, $Li_{1-x}Co_{1-y}M_yO_2$, $Li_{1-x}Ni_{1-x-z}Co_yM_zO_4$, $Li_{1-x}VOPO_4$ and $Li_xMn_{1-y}M_yO_2$ with M being an element Mg, Al, Cr or Co.

Figure 2:
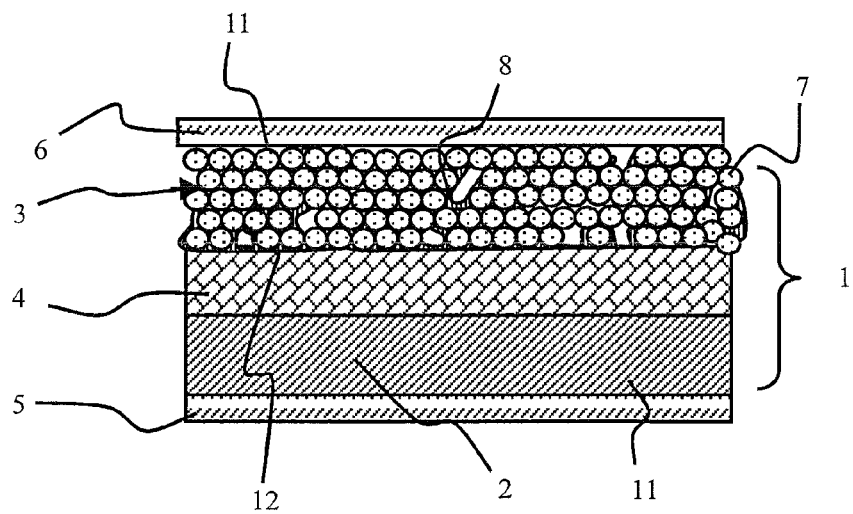
FIG. 2 represents a schematic and sectional view of a lithium battery according to a particular embodiment of the invention.

As represented in FIG. 2, the second electrode 3 is formed by a composite material comprising an electrochemically active material 7 and an amorphous lithium-based material 8 forming a vitreous matrix. The amorphous material 8 is an ionic conductor for the lithium ions. The composite material is preferably in the form of grains made of the electrochemically active material 7 coated with the amorphous material 8.

'Composite material' means a heterogeneous solid material having at least two phases whose respective qualities are complementary so as to form a material having improved total performances.

The amorphous material 8 has a melting point lower than the melting point of the electrochemically active material 7.

The amorphous material 8 is inert with respect to the electrochemically active material 7, in particular, under the operating conditions of the second electrode 3. More precisely, the amorphous material 8 cannot be electrochemically reduced with the electrochemically active material 7 under the operating conditions of the second electrode 3, in particular at high pressures and high temperatures.

The volume percentage ratio electrochemically active material 7/amorphous material 8, noted $V_E/V_A$, can vary between 99/1 and 20/80. The ratio $V_E/V_A$ depends partly on the nature of the materials 7 and 8 and the performances concerned.

The electrochemically active material 7 can be any known electrochemically active material, used to form a negative electrode for a lithium battery. Advantageously, the electrochemically active material 7 is an insertion or intercalation material for the lithium ion, $Li^+$.

The electrochemically active material 7 can be selected among metal alloys, carbonaceous materials, nitrides and oxides.

The metal alloys are for example LiAl, InSb, $Cu_2Sb$, $Cu_6Sn_5$, $Li_3Sb$, $Li_{13}Si_4$ and $Li_2CuSn$ alloys having reversible capacities of about 250 $mA.h.g^{-1}$ to 300 $mA.h.g^{-1}$. These metal alloys have an operation plateau inferior to 1.5 V.

The carbonaceous materials are preferably carbonaceous materials having reversible capacities of about 350 $mA.h.g^{-1}$ to 450 $mA.h.g^{-1}$, for example carbon, graphite, graphene or amorphous carbon.

The nitrides are preferably nitrides having reversible capacities up to 600 $mA.h.g^{-1}$. The nitrides are selected for example among $Fe_3N$, $Sb_3N$, $Ni_3N$, $Co_3N$, $Li_3FeN_2$, $Li_7MnN_4$ and $Li_{3-x}M_xN$ with M being Co, Ni or Cu.

The oxides are preferably selected among $Li_4Ti_5O_{12}$, $TiO_2$, $SnO_2$, $Cu_2O$, $MoO_3$ and $Cr_2O_3$. The operating plateau of $Li_4Ti_5O_{12}$ is located for example at 1.55 V with a reversible capacity between 100 $mA.h.g^{-1}$ and 200 $mA.h.g^{-1}$.

The choice of the electrochemically active 7 material will be dictated by the operating plateau of the electrochemically active material 7 and the conditions of use of the lithium battery, in particular the operating temperature of the lithium battery and/or pressure.

Thus, for an all-solid-state lithium battery having to work at a temperature of 400° C., one will choose an electrochemically active material 7 made of a metal alloy LiAl or InSb whose operating plateau is about 0.2 V and between 0.6V and 0.8 V, respectively. Indeed, as the melting point of the LiAl alloy is 700° C., it is recommended, for maintaining a good mechanical resistance, to use the LiAl alloy at an operating temperature lower than 600° C., ideally, lower than or equal to 550° C. In the same way, as the melting point of the InSb alloy is about 520° C., the use of InSb is recommended at an operating temperature lower than 400° C.

For an operating temperature higher than 900° C., one can use graphite as an electrochemically active material 7 because its melting point is 3675 ° C. and its operating plateau is between 0.1V and 0.3V. In the same way, $Cu_2O$ having a melting point of 1244° C. and operating at 1.1V with a reversible capacity of about 250 $mA.h.g^{-1}$ is a potential electrochemically active material 7 at this operating temperature.

The amorphous lithium-based material 8 is selected preferably among lithium halides, lithium hydrides, lithium hydroxides, lithium phosphates, lithium borates, lithium nitrates, lithium sulfates, lithium vanadates, lithium oxides and mixed lithium oxides.

Alternatively, the amorphous lithium-based material 8 can comprise at least one lithium compound and at least one additional compound.

The lithium compound is preferably selected among lithium halides, lithium hydrides, lithium hydroxides, lithium phosphates, lithium borates, lithium nitrates, lithium sulfates, lithium vanadates, lithium oxides and mixed lithium oxides.

The additional compound is preferably a halide salt, advantageously selected among the KCl, KBr, KI, KF, NaCl, NaBr, NaI and NaF salts.

The first and second electrodes 2 and 3 can contain one or more electronic conductors and/or one or more additional ionic conductors well-known by those skilled in the art. An electronic conductor can be added in order to improve the electronic conductivity and an ionic conductor in order to improve the ionic conductivity of the first and second electrodes 2 and 3.

Figure 3:
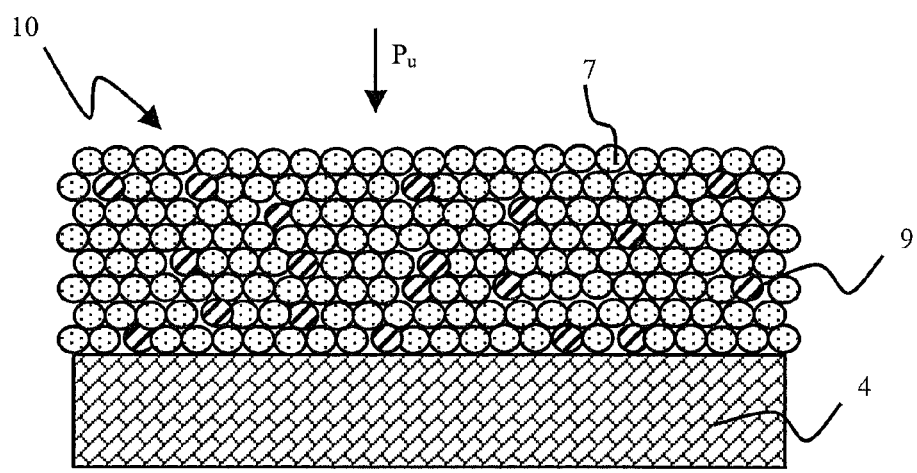
FIGS. 3 and 4 represent schematic and sectional views of an electrode according to a particular embodiment of the invention.
Figure 4:
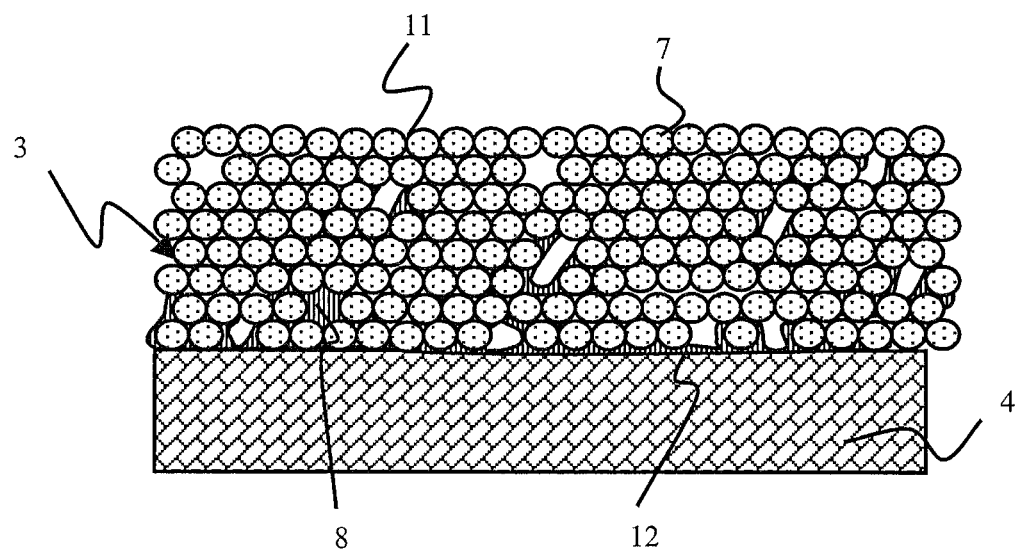

According to a first particular embodiment of the invention represented in FIGS. 3 and 4, a method for producing an all-solid-state lithium battery comprises the making of the second electrode 3 from the electrochemically active material 7 and a precursor compound 9 of the amorphous material 8.

The electrochemically active material 7 and the precursor compound 9 are initially in the form of powders.

In particular, the precursor compound 9 is in the form of a powder having an average particle diameter advantageously between 10 nm and 10 µm. The precursor compound 9 is preferably disagglomerated. 'Disagglomerated' means a powder not forming a cluster and having a homogeneous and strongly localized particle-size distribution.

The precursor compound 9 has a melting point lower than the melting point of the electrochemically active material 7 and is able to form an amorphous matrix by thermal treatment.

The precursor compound 9 for the amorphous material 8 is an ionic conductor of the lithium ions and is inert with respect to the electrochemically active material 7.

The precursor compound 9 comprises at least one lithium compound, preferably selected among lithium halides, lithium hydrides, lithium hydroxides, lithium phosphates, lithium borates, lithium nitrates, lithium sulfates, lithium vanadates, lithium oxides and mixed lithium oxides.

The precursor compound 9 can possibly comprise or be composed of a single lithium compound.

The precursor compound 9 can advantageously comprise at least one lithium compound, preferably selected among the compounds listed in the following table 1:

TABLE I

| Precursor compound | Melting point $T_f$ (° C.) |
|---|---|
| LiCl | 605 |
| LiBr | 550 |
| LiI | 446 |
| LiF | 845 |
| LiBH$_4$ | 275 |
| LiH | 680 |
| LiOH | 470 |
| LiBO$_2$ | 845 |
| LiPO$_3$ | 656 |
| LiNO$_3$ | 264 |
| LiN$_3$ | 840-850 |
| Li$_2$SO$_4$ | 845 |
| LiVO$_3$ | 620 |
| Li$_2$MoO$_4$ | 702 |
| Li$_2$B4O$_7$ | 760-880 |

Alternatively, the lithium-based precursor compound 9 can comprise at least one lithium compound and at least one additional compound.

The additional compound is preferably selected among halide salts, advantageously selected among the KCl, KBr, KI, KF, NaCl, NaBr, NaI and NaF salts.

As an example, the lithium-based precursor compound 9 can be selected among the compounds listed in the following table 2:

TABLE II

| Precursor compound | Molar ratio % | Melting point Tf (° C.) |
|---|---|---|
| LiCl/KCl | 58.8/41.2 | 354 |
| LiBr/KBr | 60/40 | 320 |
| LiI/KI | 63.3/36.7 | 285 |
| LiF/LiI | 16.5/83.5 | 411 |
| LiBr/LiF | 76 24 | 448 |
| LiCl/LiI | 34.6/65.4 | 368 |
| LiF/LiCl | 30.5/69.5 | 501 |
| LiF/LiCl/LiBr | 22/31/47 | 443 |
| LiF/LiBr/KBr | 3.5/54.5/42 | 320 |
| LiCl/KCl/NaCl | 61.2/29.7/9.1 | 429 |
| LiCl/KCl/NaCl | 8.5/59/32 | 265 |
| LiF/LiCl/LiBr/LiI | 15.4/21.7/32.9/30 | 360 |
| LiF/LiCl/LiVO$_3$/Li$_2$SO$_4$/Li$_2$MoO$_4$ | 17.4/42/17.4/11.6/11.6 | 363 |
| LiF/LiCl/LiVO$_3$/Li$_2$CrO$_4$ | 7/41.5/16.4/35.1 | 340 |
| LiF/LiCl/LiVO$_3$/Li$_2$MoO$_4$ | 16.5/47/28.8/7.6 | 387 |
| LiCl/LiBr/LiVO$_3$ | 18/72/10 | 464 |
| LiCl/LiBr/Li$_2$MoO$_4$ | 27/48/25 | 444 |

As represented in FIG. 3, the step of making the second electrode 3 comprises a step of forming a mixture of powders 10 comprising the electrochemically active material 7 and the precursor compound 9 for the amorphous material 8.

According to a particular embodiment, the mixture of powders 10 is then shaped according to any known method, in order to obtain a preform.

The step of forming the mixture of powders 10 can be performed by uniaxial pressing, in order to shape a preform, for example, as a pastille.

Alternatively, the step of shaping can be performed by cold or hot isostatic pressing.

As represented in FIG. 3, the preformed mixture of powders 10 is then placed onto a support. The support is preferably the solid electrolyte 4 for the all-solid-state lithium battery.

The preformed mixture of powder 10 has a first free main face 11 (at the top in FIG. 3) and a second main face 12 opposite the first free main face 11 (at the bottom in FIG. 3).

The preformed mixture of powders 10 is arranged on the solid electrolyte 4 so that the second main face 12 is in contact with the solid electrolyte 4.

The solid electrolyte 4 for the all-solid-state lithium battery is obtained and shaped according to any known method, before depositing the mixture of powders 10.

As an example, a solid electrolyte 4 made of ceramics is synthesized in the form of a powder, by means of a chemical process in solid state or a chemical process in solutions. A ceramics in the form of a powder is obtained after a succession of treatments such as crushing, screening and thermal treatments. The powder ceramics is then shaped, for example, by a uniaxial pressing or a cold or hot isostatic pressing, in order to increase the compactness of the solid electrolyte 4. An ultimate step of sintering at high temperature makes it possible to obtain a solid electrolyte 4 made of ceramics able to form a support for the second electrode 3.

As an example, a solid electrolyte 4 made of glass-ceramics is obtained from a ceramics powder, by thermal treatment at a temperature higher than the melting point of the ceramics. The ceramics in fusion is then poured onto a steel or platinum plate, thermally pretreated between 100° C. and 350° C. Then, it can be pressed and thermically treated below its glass transition temperature, in order to suppress mechanical stresses. An additional thermal treatment at high temperature is then performed in order to recrystallize the material and to form the solid electrolyte 4 made of ionic conducting glass-ceramics.

Finally, a polishing of the solid electrolyte 4 made of glass-ceramics or ceramics is generally performed in order to reduce the solid electrolyte 4 to a desired thickness, for example between 150 µm and 500 µm.

As represented in FIG. 4, the mixture of powders 10 in the form of a preform is subjected to a thermal treatment, according to any known method, for example by placing the solid electrolyte 4/preform 10 unit in an oven.

The temperature of the thermal treatment is fixed at a temperature lower than the melting point of the electrochemically active material 7 and higher than the melting point of the precursor compound 9. The temperature ramp can be traditionally between 0.1° C./min and 10° C./min or one can use a treatment by RTA (Rapid Thermal Annealing) to avoid the chemical interactions between the species.

The step of thermal treatment thus makes it possible to melt the precursor compound 9 without melting the electrochemically active material 7.

As represented in FIG. 4, the molten precursor compound 9 coats the particles of electrochemically active material 7. Moreover, the molten precursor compound 9 has a tendency to migrate by gravity towards the solid electrolyte 4, from the first free main face 11 to the second main face 12. Because of the flow of the molten precursor compound 9, the concentration in molten precursor compound 9 increases at the second main face 12 proportionally to the duration of the thermal treatment and becomes more important than the concentration in molten precursor compound 9 at the first main face 11.

The molten precursor compound 9 reaching the solid electrolyte 4 adheres to its surface. In particular, when the solid electrolyte 4 is porous, the precursor compound 9 goes through the pores, which improves the adhesion and the interface with the solid electrolyte 4.

The step of thermal treatment is followed by a hardening process, preferably performed at a temperature lower than or equal to the ambient temperature.

The term 'hardening' means a thermal treatment consisting in a fast cooling of a material in order to obtain particular mechanical properties. This operation consists in plunging a hot material into a colder fluid in order to provide it with new properties. The fluid can be selected among water, oil, a water spray or gases, for example, air, argon or nitrogen at the ambient temperature.

The step of hardening makes it possible to solidify the molten precursor compound 9 and to maintain its amorphous form in order to obtain the amorphous material 8.

The steps of thermal treatment and hardening make it possible to transform the precursor compound 9 into the amorphous material 8 and thus to obtain a solid, massive and nonporous second electrode 3.

In addition, the fact of using the precursor compound 9 in fusion decreases the interactions that can exist between the electrochemically active material 7 and the solid electrolyte 4 and thus improves the adhesion of the second electrode 3 with the solid electrolyte 4.

The amorphous material 8 thus formed constitutes a vitreous matrix for the particles of electrochemically active material 7. The majority of the particles of the electrochemically active material 7 at the interface between the solid electrolyte 4 and the second main face 12 is covered with a thin layer of amorphous material 8.

The process of hardening cooling, advantageously at a temperature lower than or equal to the ambient temperature, makes it possible to maintain the obtained structure in the molten state at the end of the thermal treatment and to maintain the concentration gradation of amorphous material 8 resulting from the migration of the amorphous material 8 from the first main face 11 to the second main face 12.

Advantageously, one obtains a second electrode 3 presenting an increasing gradient of the concentration in amorphous material 8 between the first main face 11 and the second main face 12. The gradation of amorphous material 8 increases from the first main face 11 to the second main face 12. On the second main face 12, the majority or preferably all the particles of electrochemically active material 7 are covered with the amorphous material 8. On the first main face 16, few or preferably no particles of electrochemically active material 7 are covered with the amorphous material 8. The volume ratio $V_E/V_A$ electrochemically active material 7/amorphous material 8 varies in the direction of the thickness of the second electrode 3, by increasing from first main face 11 to the first main face 11 (from top to bottom in FIG. 4).

The step of hardening can be followed by a step of mechanically polishing the first main face 11, according to any known method, in order to reduce the thickness of the second electrode 3.

The first electrode 2 can then be elaborated on the free face of the electrolyte 4, according to any known method, so that the solid electrolyte 4 is located between the first and second electrodes 2 and 3. The first electrode 2 can be deposited for example by using a PVD process or traditional lithography techniques. The first electrode 2 can also be made according to a production method identical to that used for the second electrode 3 described above.

The metal current collectors, 5 and 6, can then be deposited by cathode sputtering onto the free faces of the first and second electrodes 2 and 3, respectively.

The choice of the electrochemically active material/amorphous material couple will depend on their intrinsic characteristics, in particular on their melting points as well as their reactivities with respect to one another. Moreover, the choice of the materials will depend on the targeted application, in particular on the operating temperature and/or pressure, for a use in an all-solid-state lithium battery at a high pressure and/or high temperature.

The volume percentage of the amorphous material 8 is advantageously selected so as to be sufficiently high compared to the volume percentage of the electrochemically active material 7, in order to form a thin layer of amorphous material 8 between the particles of electrochemically active material 7 and the solid electrolyte 4. Advantageously, the average thickness of this thin layer of amorphous material 8 ranges between 1 nm and 50 nm, preferably between 1 nm and 10 nm. The electrochemical reduction of the electrochemically active material 7 during the charge and discharge cycles of the all-solid-state lithium battery is strongly decreased because the particles of electrochemically active material 7 of the second electrode 3 are not in direct contact with the solid electrolyte 4. The quality of the interface between the solid electrolyte 4 and the second electrode 3 is thus improved.

In addition, the electronic conductivity through the second electrode 3 can be modified when the particles of electrochemically active material 7 are completely coated with the amorphous material 8. Consequently, the volume percentage of the amorphous material 8 is selected so as to be sufficiently low compared to the volume percentage of the electrochemically active material 7 so that the amorphous material 8 covers only partially the particles of electrochemically active material 7.

In the mixture of powders 10, the volume percentage ratio electrochemically active material 7/precursor compound 9, noted $V_E/V_P$, preferably varies between 99/1 and 20/80.

The choice of the electrochemically active material 7, the precursor compound 9 as well as the volume ratio $V_E/V_P$ can easily be made and adjusted by those skilled in art to optimize the performances concerned.

As an example, one will choose LiCl, LiBr, LiI, LiF or mixed mixtures thereof as a precursor compound 9 in association with electrochemically active carbonaceous materials 7 such as graphite or vitreous carbon, on the condition that they do not react with one another. In this case, the step of thermal treatment of the mixture of powders 10 is performed under inert atmosphere in order to avoid the formation of carbon dioxide or by-products. The melting points of these precursor compounds 9, listed in Table 1, range between 265 and 845° C. The temperature of thermal treatment is fixed according to the melting point of the precursor compound 9. Thus, a preform 10 made out of graphite ($T_f=3675°$ C.) and LiF ($T_f=845°$ C.) will be treated at a temperature between the melting point of LiF and the melting point of graphite, for example between 850° C. and 1000° C., under argon atmosphere. The second electrode 3 made of composite material graphite/LiF can have a volume ratio $V_E/V_P$ between 99/1 and 70/30 with a homogeneous distribution of amorphous LiF within the second electrode 3. Alternatively, the volume ratio $V_E/V_P$ can vary according to the thickness of the second electrode 3. For example, the volume ratio can be between 50/50 and 20/80 at the second main face 12 making the interface with the solid electrolyte 4 and can vary gradually within the second electrode 3 until reaching a value $V_E/V_P$ between 90/10 and 100/0 at the first main face 11. The second electrode 3 thus formed can be used in an all-solid-state lithium battery working at a temperature up to 750° C., preferably up to 700° C.

As an example, the lithium compound LiNO3 can be used with oxides such as $Li_4Ti_5O_{12}$, $TiO_2$, $SnO_2$, $Cu_2O$, $MoO_3$ and $Cr_2O_3$, in order to form the mixture of powders 10, on the condition that they do not react with, one another. However, the temperature of the thermal treatment cannot exceed 400° C. Thus, the thermal treatment is carried out between 300 and 380° C. under air in order to dissolve $LiNO_3$ and a hardening process is then carried out at the ambient temperature in order to form the corresponding amorphous compound 8. The second composite electrode 3 obtained can be used in an all-solid-state lithium battery working at a temperature up to 250° C., preferably up to 200° C.

As an example, the lithium compounds $Li_3N$, LiCl, LiBr, LiI, LiF or mixtures thereof can be used with nitrides such as $Fe_3N$, $Sb_3N$, $Li_3FeN_2$, or $Li_7MnN_4$ in order to form the mixture of powders 10, on the condition that they do not react with one another. The preform 10 obtained, for example from $Li_3FeN_2$ and $Li_3N$, can be submitted to a thermal treatment between 850° C. and 1000° C., under nitrogenous atmosphere. The second composite electrode 3 obtained can be used in an all-solid-state lithium battery working at a temperature up to 750° C., preferably up to 700° C.

As an example, the lithium compounds LiCl, LiBr, LiI, LiF or mixtures thereof can be used with metal alloys such as LiAl, InSb or $Cu_2Sb$ to form the mixture of powders 10, on the condition that they do not react with one another. The preform 10 obtained, for example from LiAl ($T_f=700°$ C.) and LiI ($T_f=446°$ C.) can be submitted to a thermal treatment between 450° C. and 600° C. under inert atmosphere or argon atmosphere. The second composite electrode 3 obtained can be used in an all-solid-state lithium battery working at a temperature up to 400° C., preferably up to 350° C.

This first particular embodiment is particularly adapted for a mixture of powders 10 comprising a small proportion of precursor compound 9, preferably having a ratio $V_E/V_P$ ranging between 99/1 and 80/20, preferably between 97/3 and 90/10.

According to an alternative, one or more electronic conductors and/or ionic conductors and/or polymers and/or solvents can be added into the mixture of powders 10, electrochemically active material 7/precursor compound 9, before the step of thermal treatment, on the condition that they do not react with one another and/or with the electrochemically active material 7 and/or the precursor compound 9.

The electronic conductors can be made for example out of carbon, metals such as copper, titanium, aluminum, noble materials such as platinum or gold or chlorides such as $PtCl_2$ ($T_f=581°$ C.) which decompose in contact with the hydrogen in the air, during the thermal treatment, forming volatile chlorine and metal clusters of platinum.

The ionic conductors of the electrolyte type, for example, fine particles of ceramics or glass-ceramics, can advantageously be added to the mixture of powders 10 in order to improve the passage of the lithium ions within the second electrode 3.

Polymers can also be incorporated into the mixture of powders 10, in particular in order to facilitate the flow of the precursor compound 9 in fusion and also to improve the porosity of the second electrode 3. The polymers are selected for example among ethylene polyoxyde, polyethylene, polypropylene, polyethyleneglycol, polyvinyl butyrale, polyolefin, polyamides, polyesters, polyacrylates and fluorinated resins such as ethylene polytetrafluoride, ethylene polychlorotrifluoride and vinylidene polyfluoride. The polymers can possibly be used in a solvent or surfactant. We can mention for example polymers F127 or P123 of the type $[H(CH_2CH_2O)_n (CH_2CH(CH_3)O)_m(CH_2CH_2O)_nH]$ with n/m=106/70 and n/m=20/70, marketed by the company Sigma-Aldrich.

Lastly, according to the techniques used for the step of shaping the mixture of powders 10, it can be advantageous to add solvents known by those skilled in the art for optimizing this step, for example, water, an alcohol such as ethanol or isopropanol, acetone, toluene, alkanes, hexane or butane.

According to a second particular embodiment, the method for producing the all-solid-state lithium battery is identical to the first producing method described above except for the fact that the step of making the second electrode comprises the formation of a slurry from the mixture of powders 10 of the electrochemically active material 7 and the precursor compound 9, by addition of a solvent and possibly a polymer.

The later step of shaping then consists in depositing the slurry onto the solid electrolyte 4 according to any known method, for example by Spin Coating. After drying and evaporating the solvent, one carries out the thermal treatment in order to melt the precursor compound 9 and to form the amorphous material 8.

As illustrated in FIG. 3 by the vertical arrow, after drying and before the thermal treatment, a uniaxial pressing can possibly be performed by exerting a pressure $P_u$ in a single direction, perpendicular to the solid electrolyte 4.

According to a third particular embodiment, the step of making the second electrode 3 comprises a step of obtaining a mixture of powders 10, by mixing the electrochemically active material 7 and the precursor compound 9 for the amorphous material 8, identical to the first particular embodiment described above.

The mixture of powders 10 is then treated thermally at a temperature higher than the melting point of the precursor compound 9 and lower than the melting point of the electrochemically active material 7 so as to melt the precursor compound 9. The molten precursor compound 9 covers the solid particles of the electrochemically active material 7, in order to yield a pasty mixture containing the precursor compound 9 in fusion and the solid particles of the electrochemically active material 7. This mixture is then directly poured onto the solid electrolyte 4, which is preferably heated beforehand at a temperature substantially identical to the temperature of the thermal treatment and maintained at this temperature during pouring according to any known method by those skilled in the art, in order to avoid the occurrence of thermal stresses. The solid electrolyte 4/mixture unit is then hardened at the ambient temperature in order to form the amorphous material 8.

This particular embodiment is particularly adapted for a mixture of powders 10 comprising an important proportion of precursor compound 9, preferably having a ratio $V_E/V_P$ ranging between 80/20 and 20/80.

EXAMPLE

Formation of a Second Electrode 3 Made of $TiO_2/LiNO_3$ 500 mg of powdered anatase titanium dioxide, $TiO_2$, (99.8%) marketed by the company Sigma-Aldrich and 33 mg of powdered lithium nitrate $LiNO_3$ (99.99%) marketed by the company Fluka are mixed in order to obtain a mixture of powders $TiO_2/LiNO_3$ in volume percentage proportions of 90/10. 0.5 mL of an ethanolic solution of polyethyleneglycol ($C_4H_{98}O_{25}$, noted PEG), at a concentration of 0.1 mol/L, is added to the mixture of powders $TiO_2/LiNO_3$. The whole is agitated in a mortar then dried at 110° C. 100 mg of the mixture $TiO_2/LiNO_3$ thus formed are introduced into a pelletizing mould of 5 mm in diameter and are pressed uniaxially at 0.5 ton in order to form a pellet of $TiO_2/LiNO_3$. The pellet $TiO_2/LiNO_3$ thus formed is then treated thermally at 380° C. during 2 h and is hardened at the ambient temperature. One obtains a second electrode 3 made of composite material $TiO_2/LiNO_3$ in the form of a pellet having first and second main faces, respectively 11 and 12.

Figure 5:
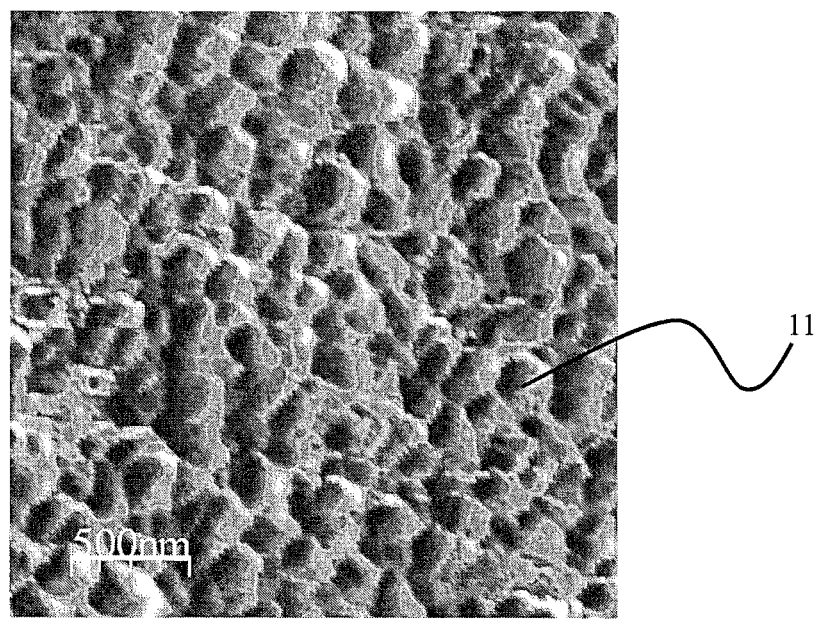
FIGS. 5 and 6 represent images, obtained by phase atomic force microscopy (AFM), of the first and second main faces of a $TiO_2/LiNO_3$ electrode according to the invention, respectively.
Figure 6:
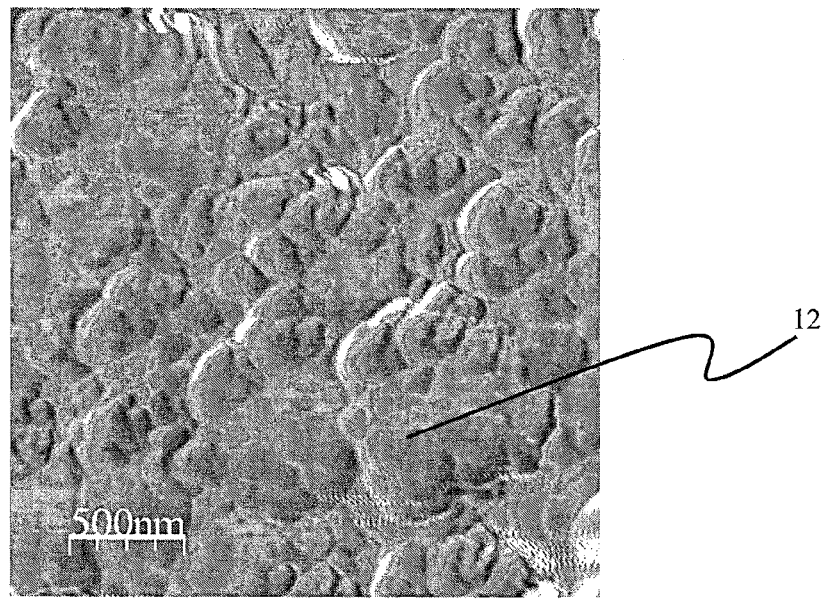

As represented in FIGS. 5 and 6, the topography of the first and second main faces, respectively 11 and 12, of the second electrode 3 made of the composite material $TiO_2/LiNO_3$ described above is visualized by AFM in an amplitude modulation mode called "tapping mode". The images obtained show a difference in morphology between the first and second main faces, respectively 11 and 12, of the second electrode 3 made of the composite material $TiO_2/LiNO_3$. The first main face 11 (FIG. 5) has a granular morphology indicating the presence of $TiO_2$ whereas the second main face 12 (FIG. 6) shows grains coated with a matrix of $LiNO_3$.

As represented in FIG. 1, the first main face 11 of the second electrode 3 made of the composite material $TiO_2/LiNO_3$ is intended to be in contact with the second current collector 6 of the all-solid-state lithium battery and the second main face 12 is intended to be in contact with the solid electrolyte 4.

Figure 7:
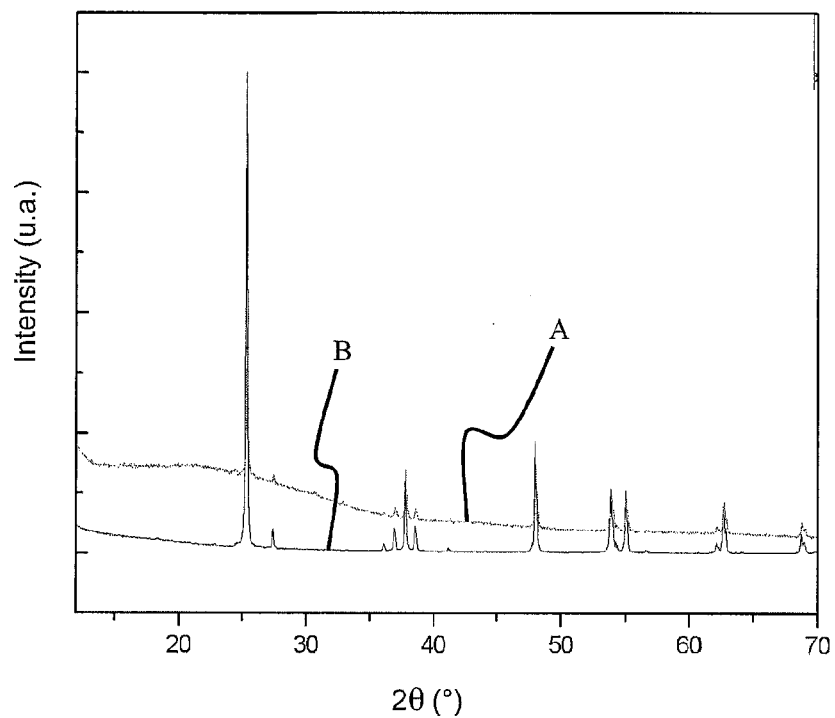
FIG. 7 represents a diagram of the x-ray diffraction (XRD) obtained on a $TiO_2/LiNO_3$ electrode according to FIGS. 5 and 6 (curve A) and a comparative XRD diagram of a commercial $TiO_2$ on (curve B).

As represented in FIG. 7, the x-ray diffraction diagram of the second electrode 3 made of the composite material $TiO_2/LiNO_3$ (curve A) in comparison with the x-ray diffraction diagram of $TiO_2$ on the market (curve B) indicates the presence of a single phase in $TiO_2$. The bump observed at the beginning of the diagram of the second electrode 3 made of the composite material $TiO_2/LiNO_3$ (curve A) indicates the presence of an amorphous phase corresponding to the amorphous material 8 of $LiNO_3$, forming the vitreous matrix.

The all-solid-state lithium battery according to the invention is particularly adapted to a use at high temperatures and/or high pressures.

The all-solid-state lithium battery according to the invention is remarkable in that it includes a second electrode inert with respect to the solid electrolyte at high temperatures and/or high pressures, in particular with respect to a solid electrolyte made of ceramics or glass-ceramics.

Moreover, contrary to the lithium batteries of prior art, the all-solid-state lithium battery comprising an electrode according to the invention presents good electrochemical performances at high temperatures and/or high pressures and thus makes it possible to reach operation voltages of 2V to 5V.

The invention claimed is:

1. A method for producing a lithium ion battery, the method comprising:
    obtaining a first electrode, an electrolyte, and a second electrode, and
    assembling the first electrode, the electrolyte, and the second electrode to form a battery,
    wherein the obtaining of the first electrode and/or the second electrode comprises:
        making the first electrode and/or second electrode wherein the making of the first and/or the second electrode comprises the following successive steps of:
        forming a mixture of powders comprising the electrochemically active material and a precursor compound for the amorphous lithium-based material, the precursor compound being an ionic conductor of the lithium ions, inert with respect to the electrochemically active material and having a melting point lower than the melting point of the electrochemically active material,
        thermally treating the mixture of powders at a thermal treatment temperature lower than the melting point of the electrochemically active material and higher than the melting point of the precursor compound so as to melt the precursor compound without melting the electrochemically active material and,
        cooling by a hardening process to obtain the amorphous lithium-based material.

2. The method according to claim 1, wherein the hardening process is carried out at a temperature lower than or equal to the ambient temperature.

3. The method according to claim 1, wherein the precursor compound comprises at least one lithium compound chosen among lithium halides, lithium hydrides, lithium hydroxides, lithium phosphates, lithium borates, lithium nitrates, lithium sulfates, lithium vanadates, lithium oxides and mixed lithium oxides.

4. The method according to claim 1, wherein the precursor compound comprises at least one lithium compound and at least one additional compound selected among halide salts.

5. The method according to claim 1, wherein the volume percentage ratio electrochemically active material/precursor compound in the mixture of powders varies between 99/1 and 20/80.

* * * * *